(12) United States Patent
Verwys

(10) Patent No.: US 9,987,963 B2
(45) Date of Patent: Jun. 5, 2018

(54) LOADING DEVICE

(71) Applicant: Paul Verwys, Grand Rapids, MI (US)

(72) Inventor: Paul Verwys, Grand Rapids, MI (US)

(*) Notice: Subject to any disclaimer, the term of this patent is extended or adjusted under 35 U.S.C. 154(b) by 0 days. days.

(21) Appl. No.: 13/888,339

(22) Filed: May 6, 2013

(65) Prior Publication Data

US 2014/0328658 A1 Nov. 6, 2014
US 2017/0166102 A9 Jun. 15, 2017

Related U.S. Application Data

(63) Continuation-in-part of application No. 12/425,373, filed on Apr. 16, 2009, now abandoned.

(51) Int. Cl.
*B60P 1/43* (2006.01)
*B60P 3/12* (2006.01)
*B60P 3/06* (2006.01)

(52) U.S. Cl.
CPC .............. *B60P 1/433* (2013.01); *B60P 3/06* (2013.01); *B60P 3/122* (2013.01)

(58) Field of Classification Search
CPC .. B60P 1/43; B60P 1/431; B60P 1/437; B60P 1/433; B60P 3/06; B60P 3/122; B65G 69/30

USPC .......................................................... 414/537
See application file for complete search history.

(56) References Cited

U.S. PATENT DOCUMENTS

| | | | | |
|---|---|---|---|---|
| 3,768,673 A | * | 10/1973 | Nydam et al. | 414/522 |
| 4,624,619 A | * | 11/1986 | Uher | 414/537 |
| 4,792,274 A | * | 12/1988 | Cockram | 414/537 |
| 5,090,335 A | * | 2/1992 | Russell | 108/44 |
| 7,488,025 B1 | * | 2/2009 | Roberson | 296/61 |
| 7,976,264 B1 | * | 7/2011 | Pope | 414/480 |
| 8,302,235 B1 | * | 11/2012 | Bailie et al. | 14/69.5 |
| 2004/0200695 A1 | * | 10/2004 | Armour | 198/414 |
| 2010/0266378 A1 | * | 10/2010 | Verwys | 414/537 |

* cited by examiner

*Primary Examiner* — Michael McCullough
*Assistant Examiner* — Mark Hageman
(74) *Attorney, Agent, or Firm* — Cherskov Flaynik & Gurda, LLC

(57) ABSTRACT

A device that may be mounted on a bed of a pickup truck to enable smaller vehicles, such as motorcycles, snowmobiles, or all-terrain vehicles to enter from the ground level upon a platform of the loading device. This is accomplished by the loading device having a ramp that can be pulled outwardly or rearwardly from said device, and a motorcycle can drive up the ramp to the platform. A dolly slide is pulled outwardly from the device, and extends above the tailgate. The ramp then extends downwardly from the dolly slide, so that no weight or load is displaced on the tailgate.

2 Claims, 16 Drawing Sheets

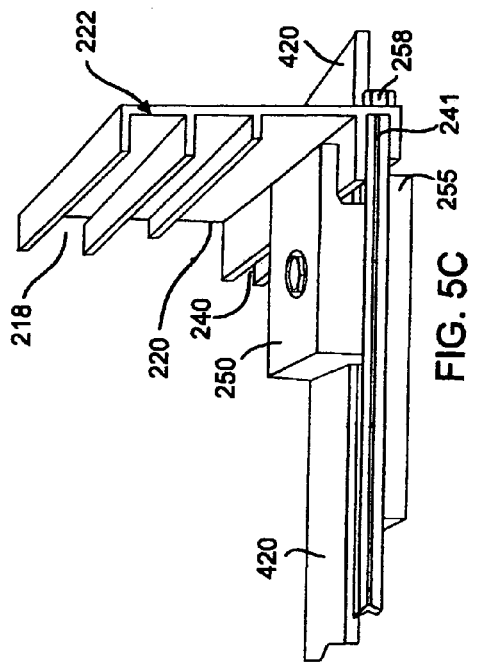
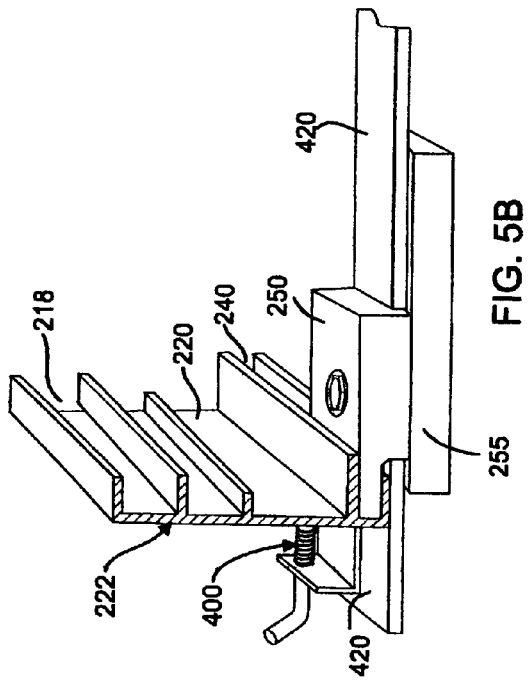
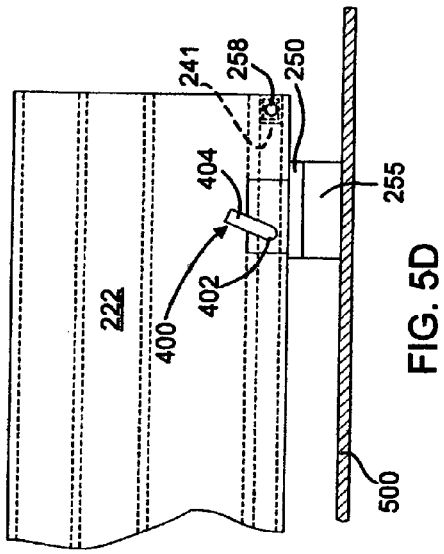

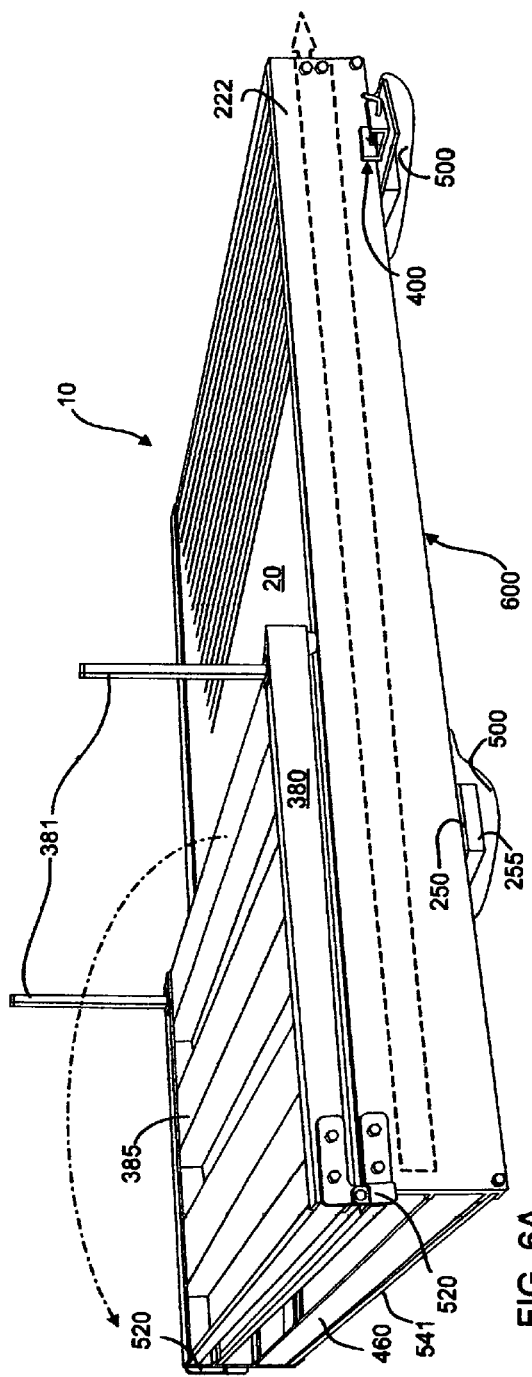
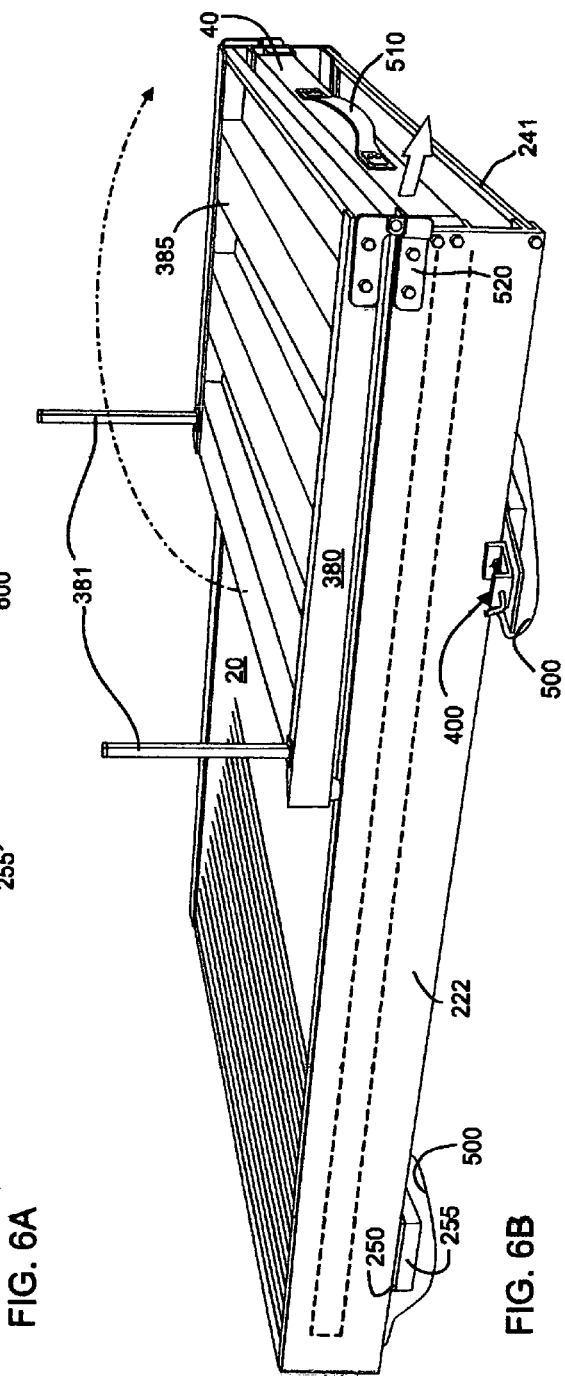
FIG. 6A
FIG. 6B

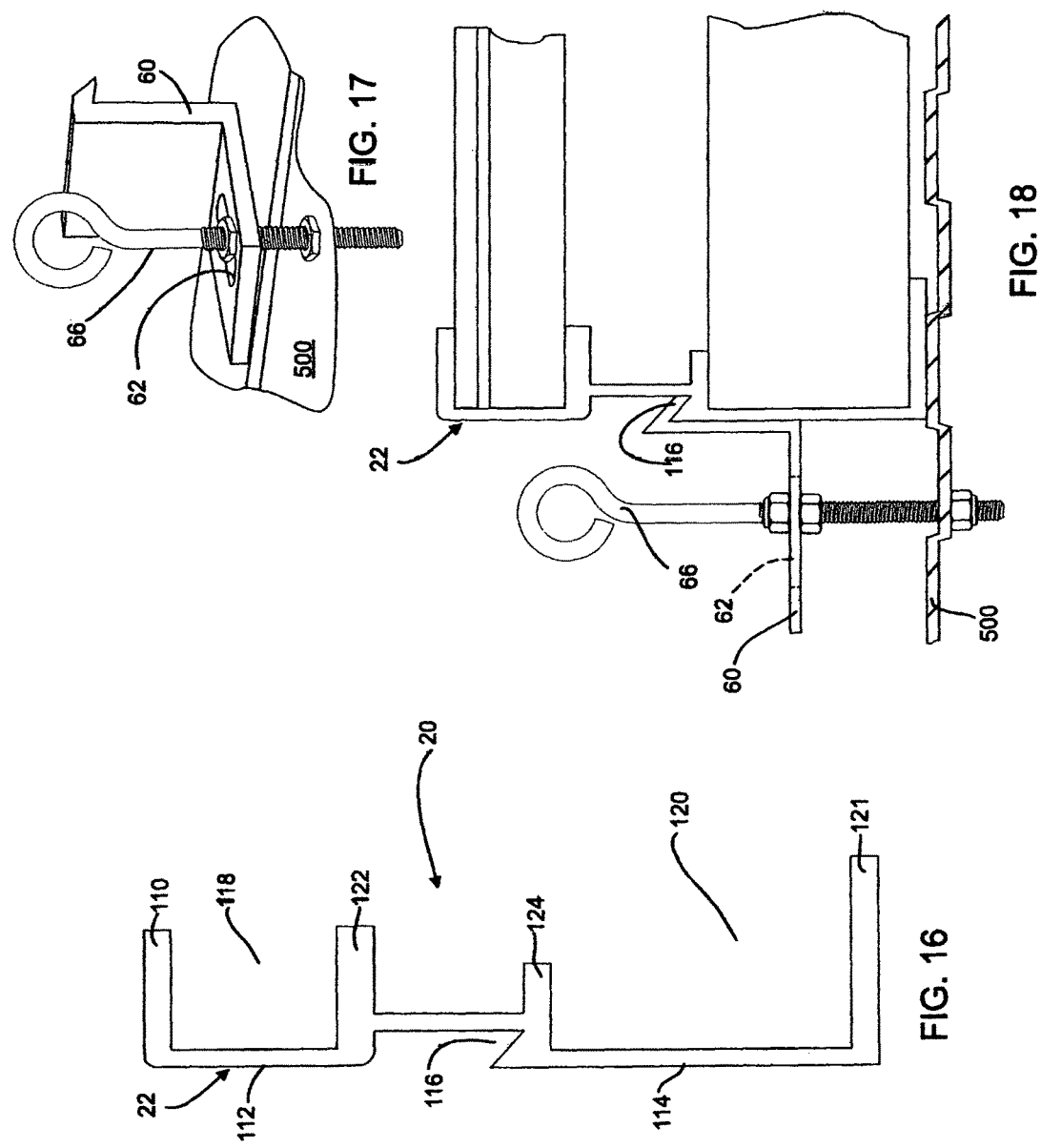

LOADING DEVICE

CROSS REFERENCE TO RELATED APPLICATIONS

This is a continuation in part application, which claims priority from a parent application Ser. No. 12/425,373 still pending as of the filing of this CIP application, which claims priority from provisional patent application No. 61/1045288 filed on 16 Apr. 2008, titled LOADING DEVICE.

GOVERNMENT RIGHTS

This invention was not made with Government support. The Government does not have any rights in this invention.

BACKGROUND OF THE INVENTION

Loading devices may be used to load, or unload things from one level, to a different level. For example, a loading device may be used to assist in loading motorcycles onto the beds of pickup trucks.

U.S. Pat. No. 5,795,125 ("the '125 patent") illustrates one type of loading device, called a truck ramp assembly 10. This discloses a platform assembly having an closed front end (no reference numeral); a pair of longitudinally extending track members (no reference numerals); evenly spaced transverse support members 40; a hollow interior 26; and a pair of wheels 70 on opposite sides thereof at a first end (no reference numeral). The '125 patent requires the use of a tailgate because a pair of wheels 70 rest on the tailgate. Further, wheels 82 also rest on the tailgate. Because the fore mentioned wheels rest on the tailgate of the pickup truck, the tailgate may encounter loads, which may damage the tailgate or the operation of the tailgate. The '125 patent also has apertured brackets 32 to secure the platform assembly 10 to a vehicle 12. The '125 patent does not disclose a way to accommodate for varied pickup truck bed lengths. The '125 patent does not disclose an apparatus by which a short bed pickup, such as 8 ft., can accommodate a load requiring a bed or platform length of a long bed, such as 11 ft.

U.S. Pat. No. 7,488,025 to Roberson discloses a Truck Bed Extender and Telescoping Ramp. Roberson has an extender telescopically and slidably received within said casing for slidably extending rearward cantilevered over the truck tailgate when the tailgate is in a horizontal position. However the casing in Roberson cannot be fixed in a horizontal position so that it can be used as a working surface.

As can be seen, there is a need for a loading device that does not cause weight to bear on the tailgate; that can accommodate for varied pickup truck bed lengths; and that can allow a short bed truck to receive a load requiring a truck bed or platform length of a long bed pickup truck.

There is also a need to loading device that can be positioned in a substantially horizontal position to use as a working surface.

There is also a need to have a surface that can flip forwardly after the casing is extended rearwardly, so the entire length of the bed can be used.

SUMMARY OF THE INVENTION

One aspect of the present invention is a loading device, comprising a housing 600 slidably disposed to a bed 500; a dolly slide 460 slidably disposed to said housing 600; and a ramp 40 slidably disposed to said dolly slide 460; whereby said housing 600 can slide relative to said bed 500.

Another aspect is a loading device 10, comprising: a platform side 22 secured to opposed sides of a ramp 40; a mounting bracket 60 secured to said platform side 22 and a bed 500 of a vehicle; said platform side 22 having a decking channel 118; and a ramp channel 120 disposed under said decking channel 118.

These and other features, aspects and advantages of the present invention will become better understood with reference to the following drawings, description and claims.

BRIEF DESCRIPTION OF THE DRAWINGS

FIG. 5B is a sectional pictorial of one embodiment of the platform side and the sliding block.

FIG. 5C is a non-sectional pictorial of one embodiment of the platform side.

FIG. 5D is a side view of the platform side.

FIG. 6A is a pictorial of a front hinge plate on one side of the loading device.

FIG. 6B is a pictorial of a front hinge plate on the other side of the loading device.

FIG. 16 is a pictorial view of an embodiment of a platform side.

FIG. 17 is a pictorial of an A-type platform side.

FIG. 18 is a pictorial of the platform side with the mounting bracket.

DETAILED DESCRIPTION OF THE INVENTION

The following detailed description is of the best currently contemplated modes of carrying out the invention. The description is not to be taken in a limiting sense, but is made merely for illustrating the general principles of the invention, since the scope of the invention is best defined by the appended claims.

Figure 1:
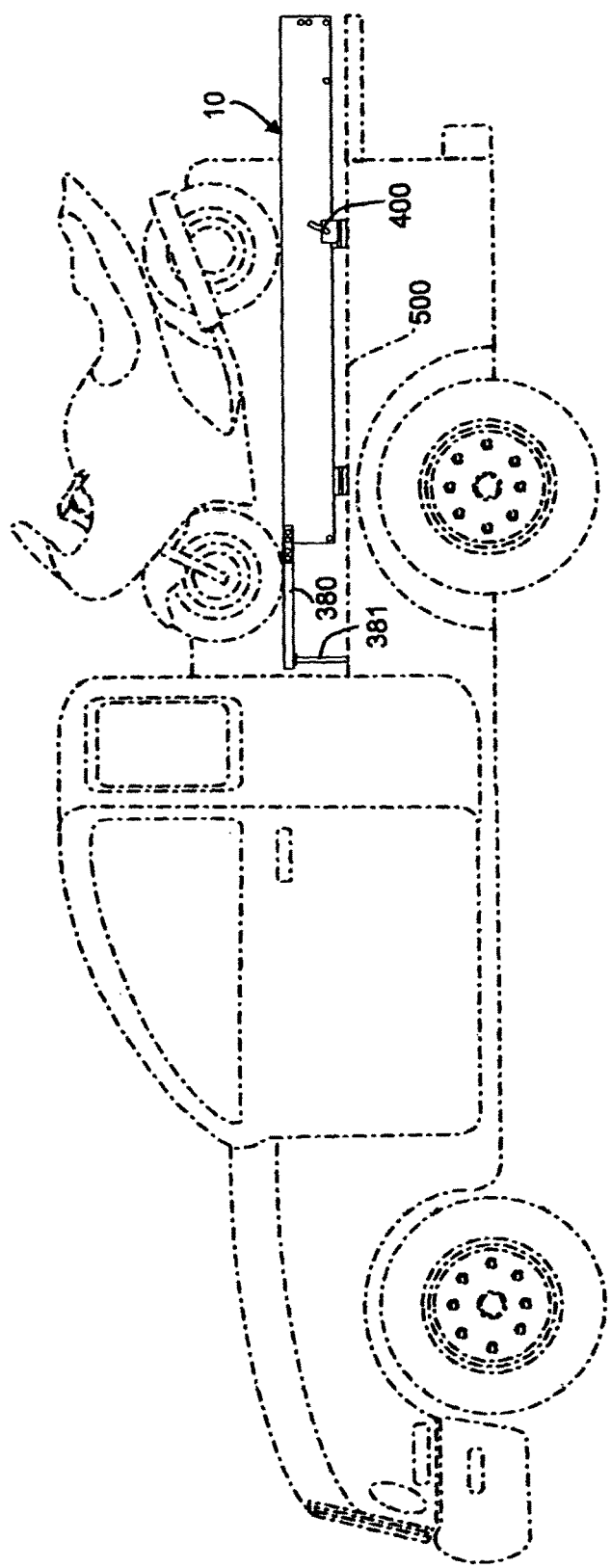
FIG. 1 is a side pictorial view of one embodiment of the present invention in the stowed position.

REFERENCE NUMERALS 10 loading device
20 platform 22 platform side
30 member
32 decking
34 decking tongue
35 decking support member
36 decking groove
37 ramp side
40 ramp
50 hinge plate
52 hinge plate tongue
54 hinge plate groove
60 mounting bracket
70 mounting bracket slot
80 mounting bracket base
90 mounting bracket arm
100 mounting bracket finger
102 hook portion
110 platform top
112 first side surface
114 second side surface
116 finger securement catch
118 decking channel
120 ramp channel
121 wheel stopper
122 decking support
123 locking means
124 extension
126 ramp support
130 ramp-platform displacement wheel
140 leg
142 leg extension
150 ramp extender
218 decking channel
220 ramp channel
222 platform side or side
240 sliding channel
241 sliding channel stop member
250 sliding blocks
255 sliding block extension
258 fixator bolt
340 second embodiment ramp
360 second embodiment platform
380 forward hinge plate
381 forward hinge plate leg
400 platform lock or platform locking means
404 locking pin
420 base frame
460 dolly slide
470 ramp wheel
480 carriage
500 bed
510 handle
520 hinge
132 stop member
550 ramp leg housing
560 leg top channel
570 dolly slide side
572 inside
574 inside lower member
580 ramp wheel stopper
600 housing FIG. 1 illustrates an embodiment of a loading device 10 installed on the bed 500 of a pickup truck. A motorcycle is illustrated with the front tire resting on the forward hinge plate 380. The rear tire is resting on the platform 20.

Figure 2:
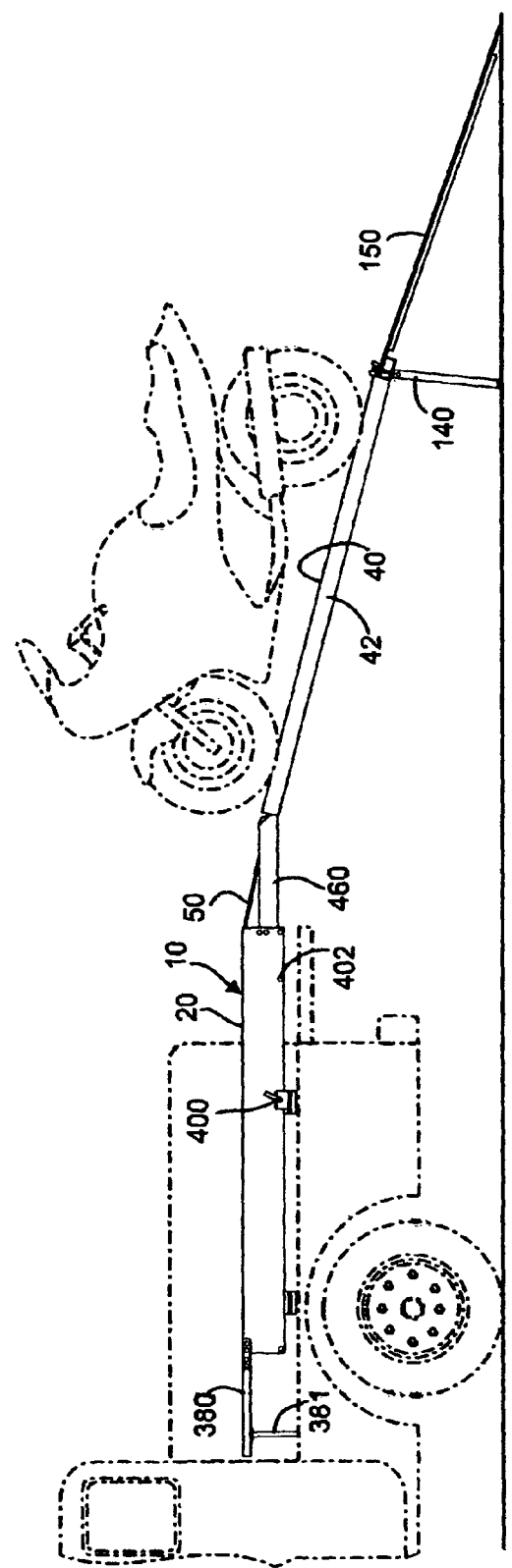
FIG. 2 is a side pictorial view of an embodiment of the present invention in the deployed position.

FIG. 2 illustrates a pictorial of a motorcycle on the ramp 40. The ramp 40 is pulled out; and the ramp extender 150 may also be deployed. The ramp 40 may be supported by a leg 140. The forward hinge plate 380 may be folded forward. The dolly slide 460 is pulled out; and the platform 20 is illustrated as pulled out rearwardly with respect to the truck bed 500. The forward hinge plate 380 may be folded rightwardly or rearwardly so that it rests on the platform 20. The platform 20 or loading device 10 may be locked in place by the locking means 400 in a stowed position, for example, when in transit. In one embodiment the locking means 400 may be a locking pin 404 that may engage with a locking hole 402 so that the loading device 10 or platform does not move. This may be preferred when the vehicle on which the loading device 10 is displaced is in transit.

Figure 3:
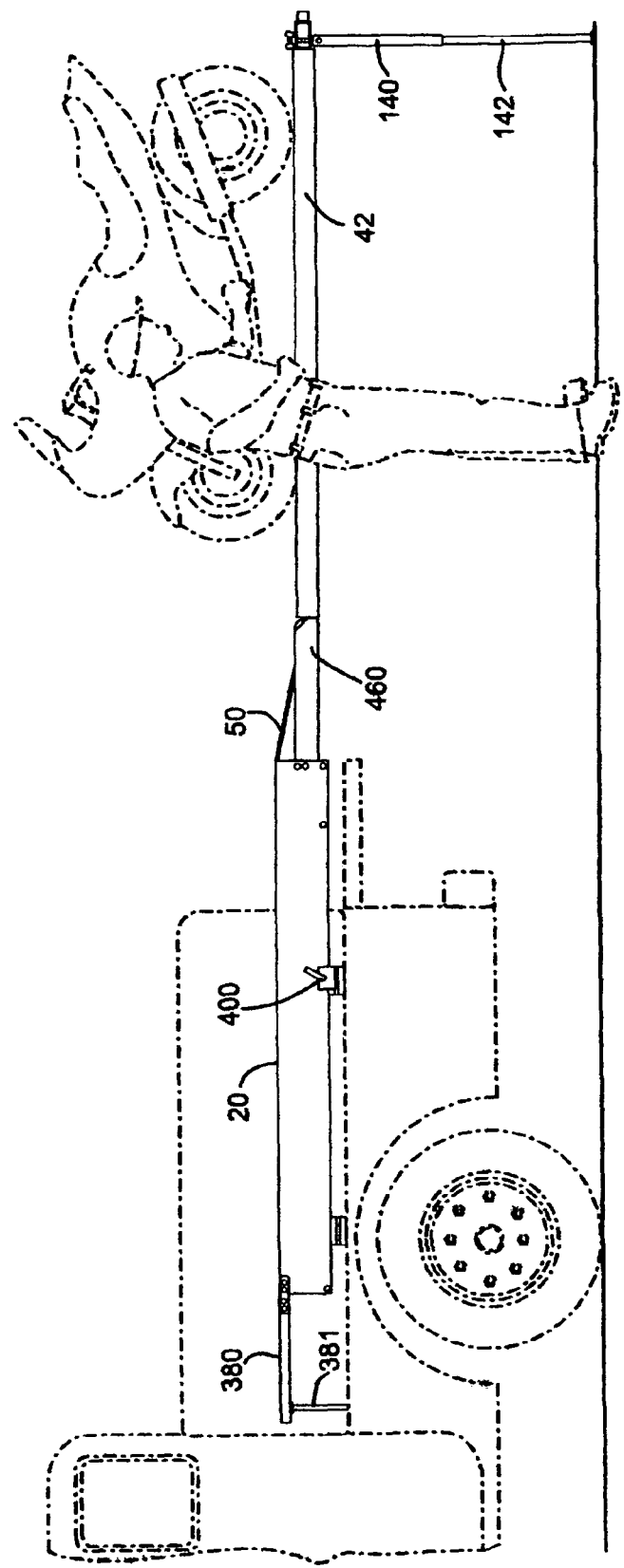
FIG. 3 is a side pictorial of an embodiment of the present invention, used as a workbench.

FIG. 3 illustrates a pictorial of the loading device 10 used as a workbench by the ramp 40 being oriented in a substantially horizontal position by a leg 140, and a let extension 142 that may telescope and lock in place by any conventional means.

Figure 4:
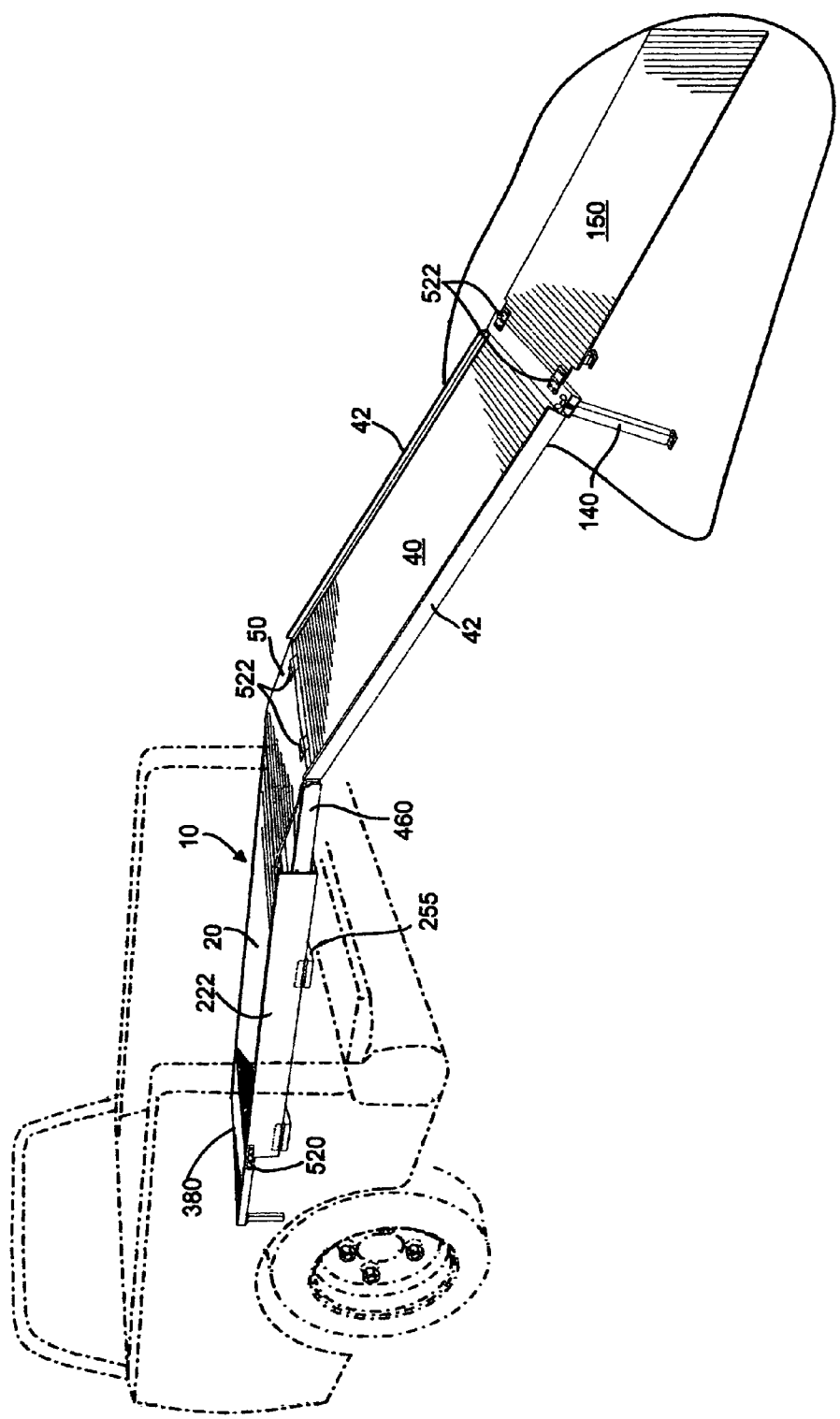
FIG. 4 is another pictorial of the present invention.

FIG. 4 illustrates another pictorial view of one embodiment of the present invention 10. The loading device 10 is illustrated with the front hinge plate 380 or forward hinge plate 380 extended leftwardly or forwardly via a hinge 520. The dolly slide 460 is shown as disposed rearwardly. The rear hinge plate 50 is shown as flipped forwardly via a hinge 520. The rear hinge plate 50 may be flipped rearwardly also. The rear hinge plate 50 may also be removed. Removal of the rear hinge plate 50 may be useful when a motorcycle or other vehicle is on the platform 20, and an exhaust pipe extends in such a way to prevent the rear hinge plate 50 from flipping rearwardly on to the ramp 40. The ramp extender 150 is shown as deployed or flipped rearwardly from the ramp 40. The ramp extender 150 and the rear hinge plate 50 may both be flipped or folded to rest on the ramp 40 via a hinge 520. This way the ramp 40 may be pushed or displaced under the platform 20. This position may be referred to as the stowed position. The legs 140 may be removable so that the ramp 40 may be displaced in the stowed position.

Figure 5A:
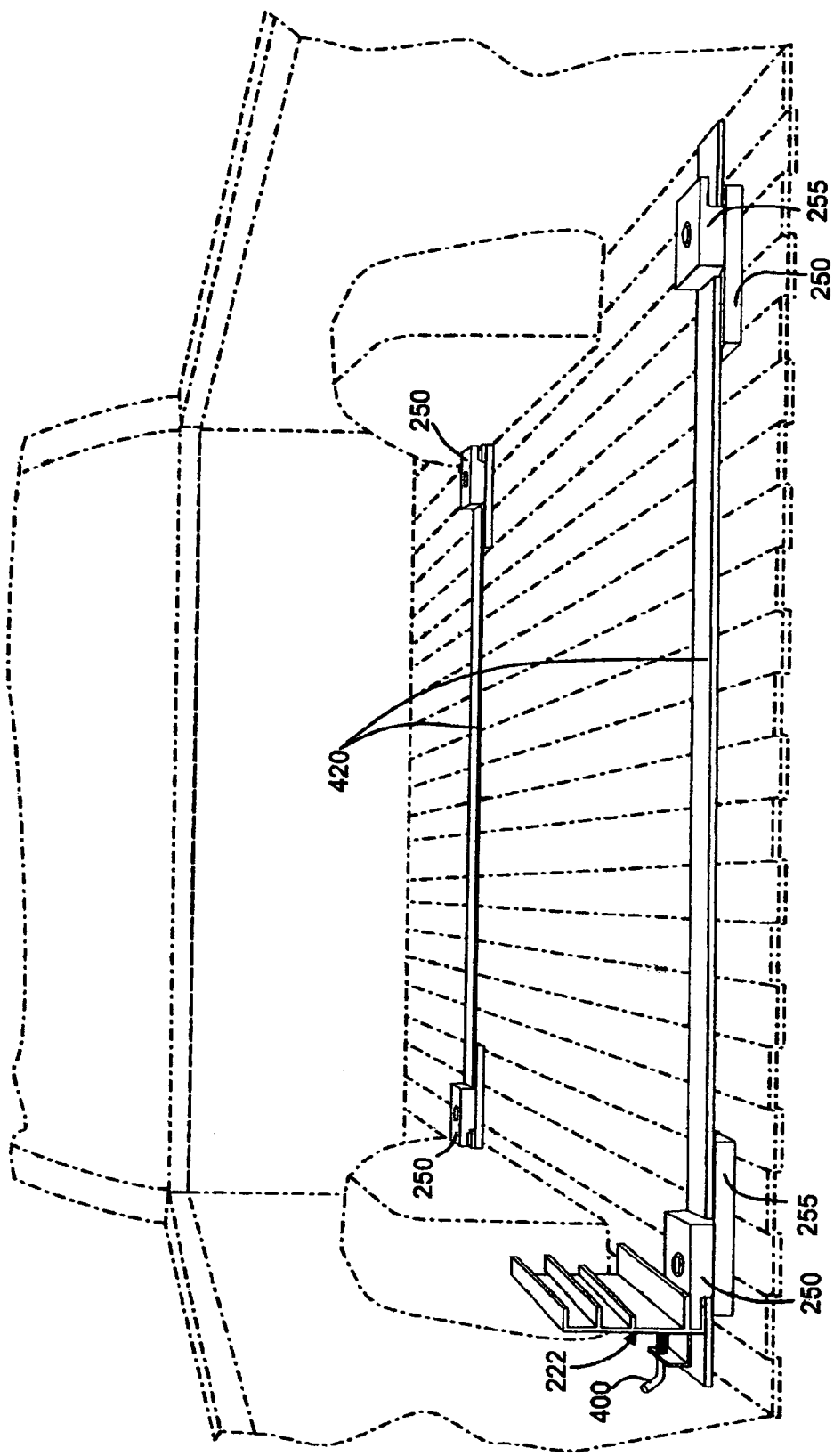
FIG. 5A is a pictorial of components of one embodiment of the present invention, used to secure the loading device to a bed.

FIG. 5A illustrates one embodiment of securing the loading device 10 hinge plate 50 from flipping rearwardly on to the ramp 40. The ramp extender 150 is shown as deployed or flipped rearwardly from the ramp 40. The ramp extender 150 and the rear hinge plate 50 may both be flipped or folded to rest on the ramp 40 via a hinge 520. This way the ramp 40 may be pushed or displaced under the platform 20. This position may be referred to as the stowed position. The legs 140 may be removable so that the ramp 40 may be displaced in the stowed position.

FIG. 5A illustrates one embodiment of securing the loading device 10 to a pickup truck bed 500. A base frame 420 may be disposed on a pickup truck bed 500 in a location to not disrupt wiring a gas tank beneath. A sliding block extension 255 may be secured immediately above a pickup truck bed 500. A sliding block 250 may be disposed immediately above and secured to the sliding block extension 255. A sliding channel stop member 241 may be disposed between said sliding block extension 255 and said sliding block 250. Two base frames 420 may be disposed on the bed 500 of a truck.

FIG. 5B illustrates on embodiment of the base frame 420 as illustrated in FIG. 5A. FIG. 5B illustrates an embodiment whereby a portion of the sliding block 250 may be disposed in a sliding channel 240. This allows the entire B-type platform side, also referred to as side 222 to move forwardly and rearwardly with respect to a pickup truck bed 500 to which it may be slidably disposed. The platform 20 may be secured to the B-type platform side 222 via the B-type decking channel. This relationship is illustrated in FIG. 7.

FIG. 5C illustrates a pictorial whereby the platform side 222 may be secured to a sliding channel stop member 241 via fastener, such as a bolt 258.

FIG. 5D illustrates an embodiment of the B-type platform side 222, as illustrated in FIG. 5B, having a locking means 400. The locking means 400 may be a locking pin 404 that may be removably disposed within a lock hole 402. When the locking pin 404 is removed from engagement with the lock hole 402, then the loading device 10 may slide forwardly and rearwardly via the sliding blocks 250, which may be secured to the bed 500 of a truck via a sliding block extension 255. This way the loading device 10 may be stowed entirely within the bed 500 of a truck when the front hinge plate 380 is folded rearwardly; or it may be pulled out from the bed, as illustrated in FIGS. 1-4. A bolt 258 may secure the type platform side 222 to a sliding channel stop member 241.

Figure 7:
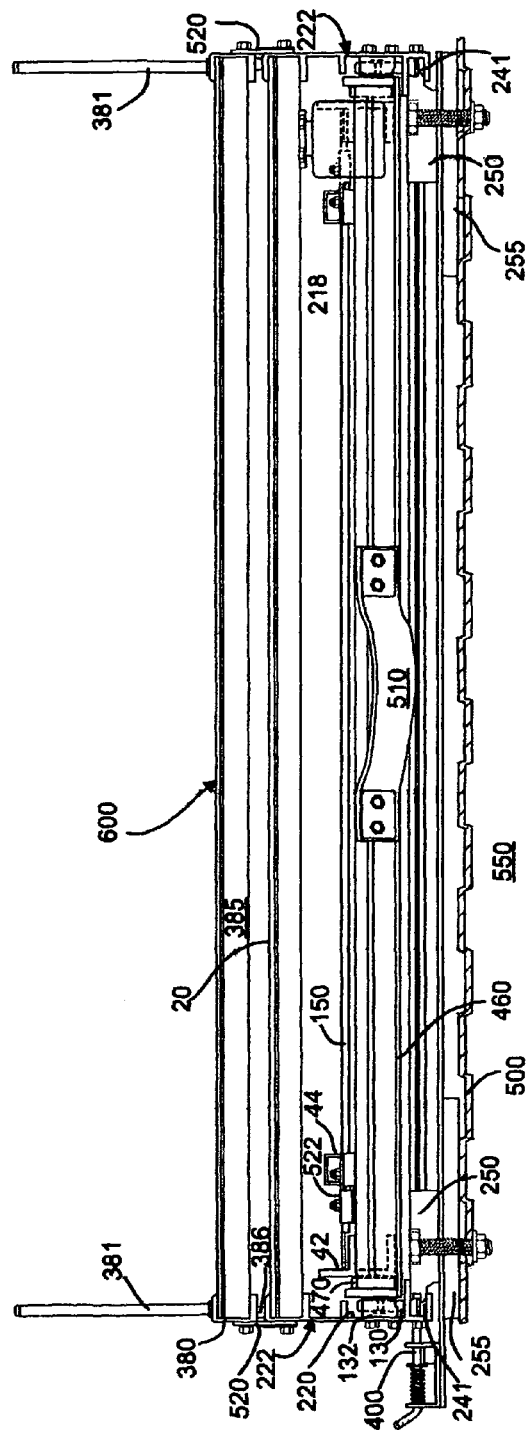
FIG. 7 is a pictorial of the rear view from the stowed position.

The platform 40 may be secured to a platform side 222 on opposed sides, as seen in FIG. 7, to define a housing 600. The ramp dolly slide 460 may then be slidably disposed within the housing 600. The ramp 40 may also be slidably disposed within the housing 600.

FIG. 6A illustrates an embodiment when a front hinge plate 380 is hingedly disposed on one side of the platform side 222. This is illustrated in FIGS. 1-4. FIG. 6B illustrates another embodiment whereby a front hinge plate 380 may be disposed on the other side of the platform side 222. In the embodiment as illustrated in FIG. 6B, the front hinge plate 380 may flip rearwardly.

FIG. 7 illustrates an embodiment of a rear pictorial showing the front hinge plate 380 hingedly disposed to the platform side. Front hinge plate legs 381 may extend from the front hinge plate 380. The platform 20 may be securely disposed within the decking channel 218. The platform 40 may be slidably disposed within a B-type ramp channel 220. The sliding block 250 may be slidably disposed within the sliding channel 240. The platform 20 may be securely disposed within the B-type decking channel 218. A handle 510 may be disposed on the end of the ramp 40. The sliding block 250 may be secured to a sliding block extension 255 and a bed 500 via a fastener, such as a bolt 258.

Although a sliding block 250 is disclosed as one means by which the loading device 10 may slide back and forth, other means may be used. Such as ball bearings or wheels.

Figure 8:
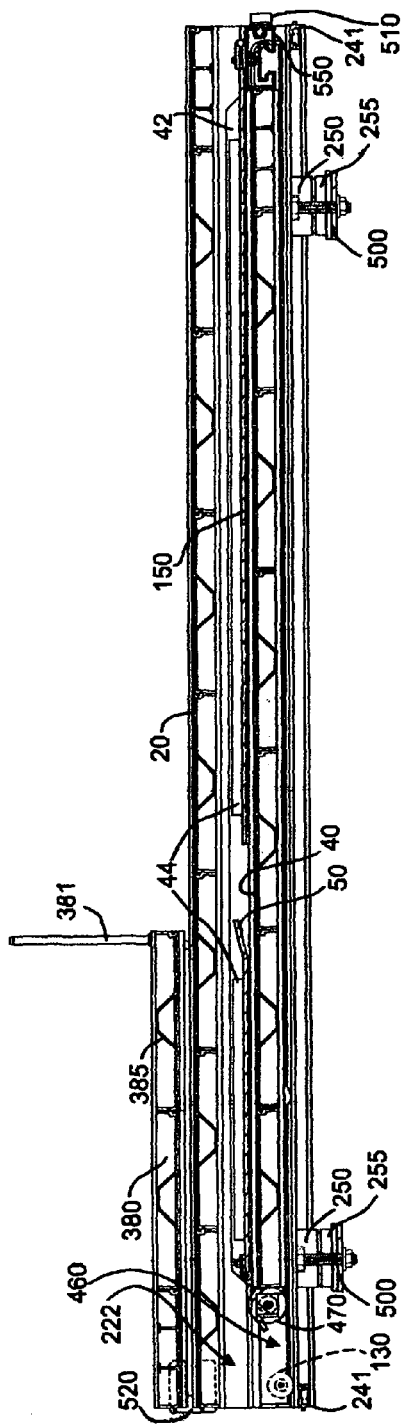
FIG. 8 is a sectional pictorial of a side view of the stowed position.
Figure 11:
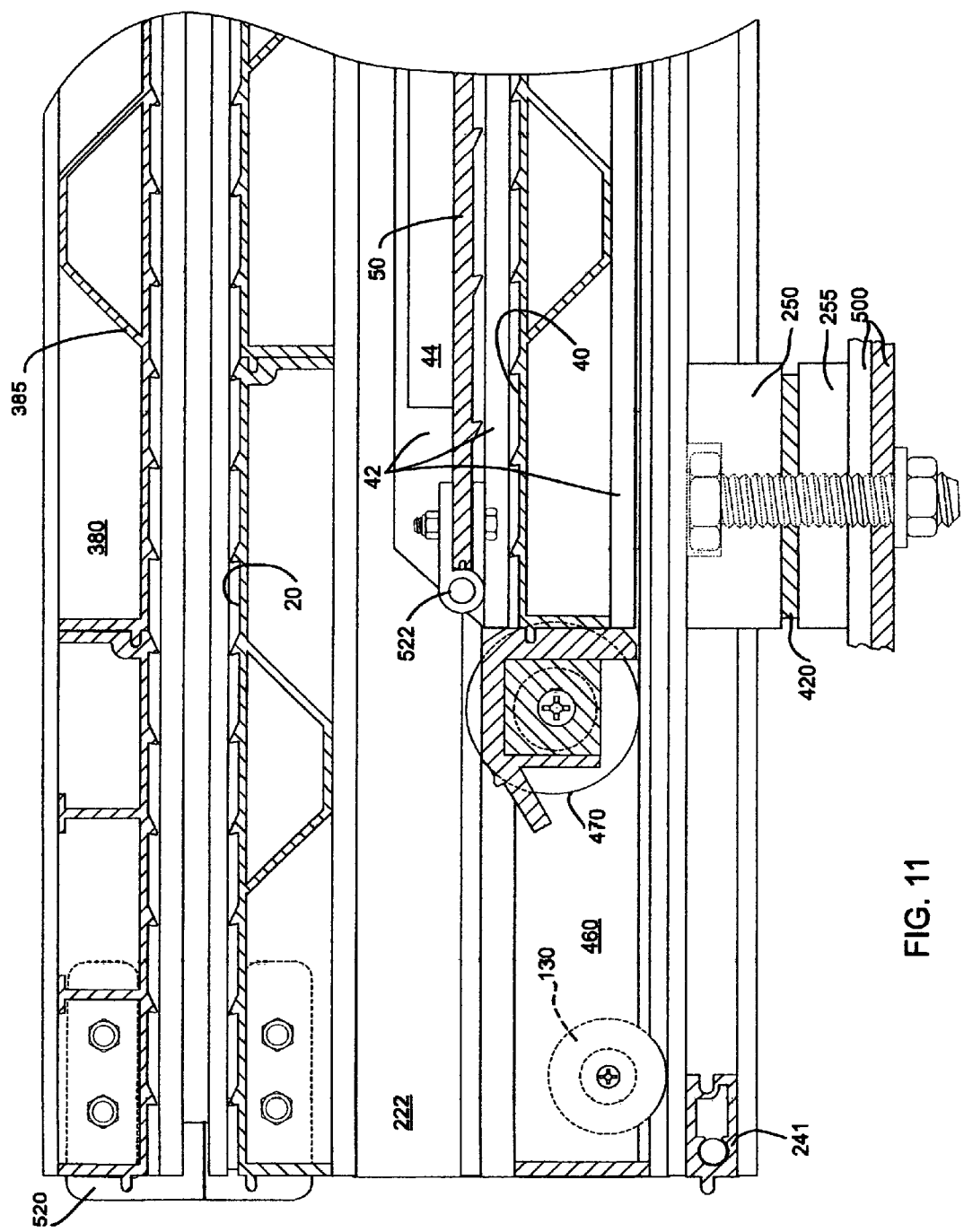
FIG. 11 is a pictorial view of the dolly slide, which allows the ramp to be pulled out from under the platform.

FIG. 8 illustrates a sectional side view pictorial of an embodiment of the present invention 10. The front hinge plate 380 may be hingedly connected to the B-type platform side 222. The rear hinge plate 50 may be hingedly disposed to one side of the ramp 40. The ramp extension 150 may be hingedly disposed to the other side of the ramp 40. The ramp 40 may have a ramp wheel 470 slidably engaged with the dolly slide 460 as illustrated in FIG. 11. The dolly slide 460 may have a ramp-platform displacement wheel 130 that may rotatably engage and roll within the B-type ramp channel 220. This allows the loading device 10 to be pulled or displaced rearwardly by the sliding block 250 sliding relationship with the sliding channel 240 until a stop member 132 contacts a sliding block 250. This allows the loading device 10 to be pulled rearwardly with respect of a truck bed 500. Then the handle 510 can be pulled out or rearwardly to pull the ramp 40 dolly carriage 460 out from under the platform 40. Typically, the dolly carriage 460 extends out above a tailgate so that no load or weight is applied to the tailgate. Then the handle 510 can be further pulled to deploy the ramp 40, as shown in FIG. 2. The dolly carriage 460 may be limited from pulling entirely out by any conventional means that may stop the ramp-platform displacement when 130.

If the stop member 540 was not there, then the entire loading device 10 may be pulled from the bed 500 and fall upon the ground. However, other means for preventing the loading device from falling out may be utilized.

Figure 9:
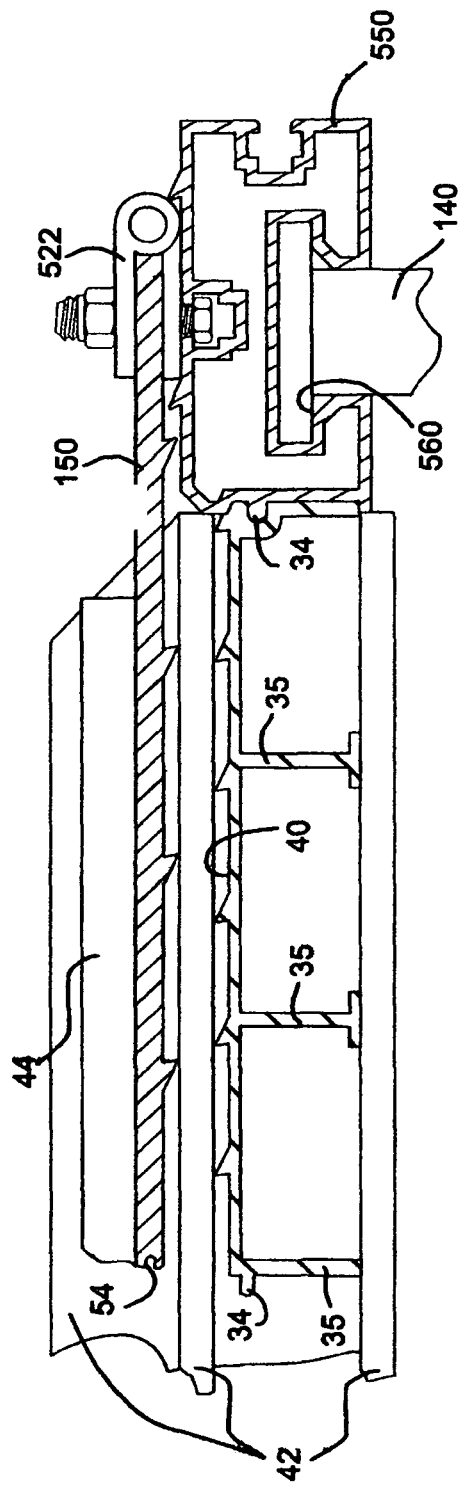
FIG. 9 is a pictorial view of the ramp composed of decking.
Figure 10:
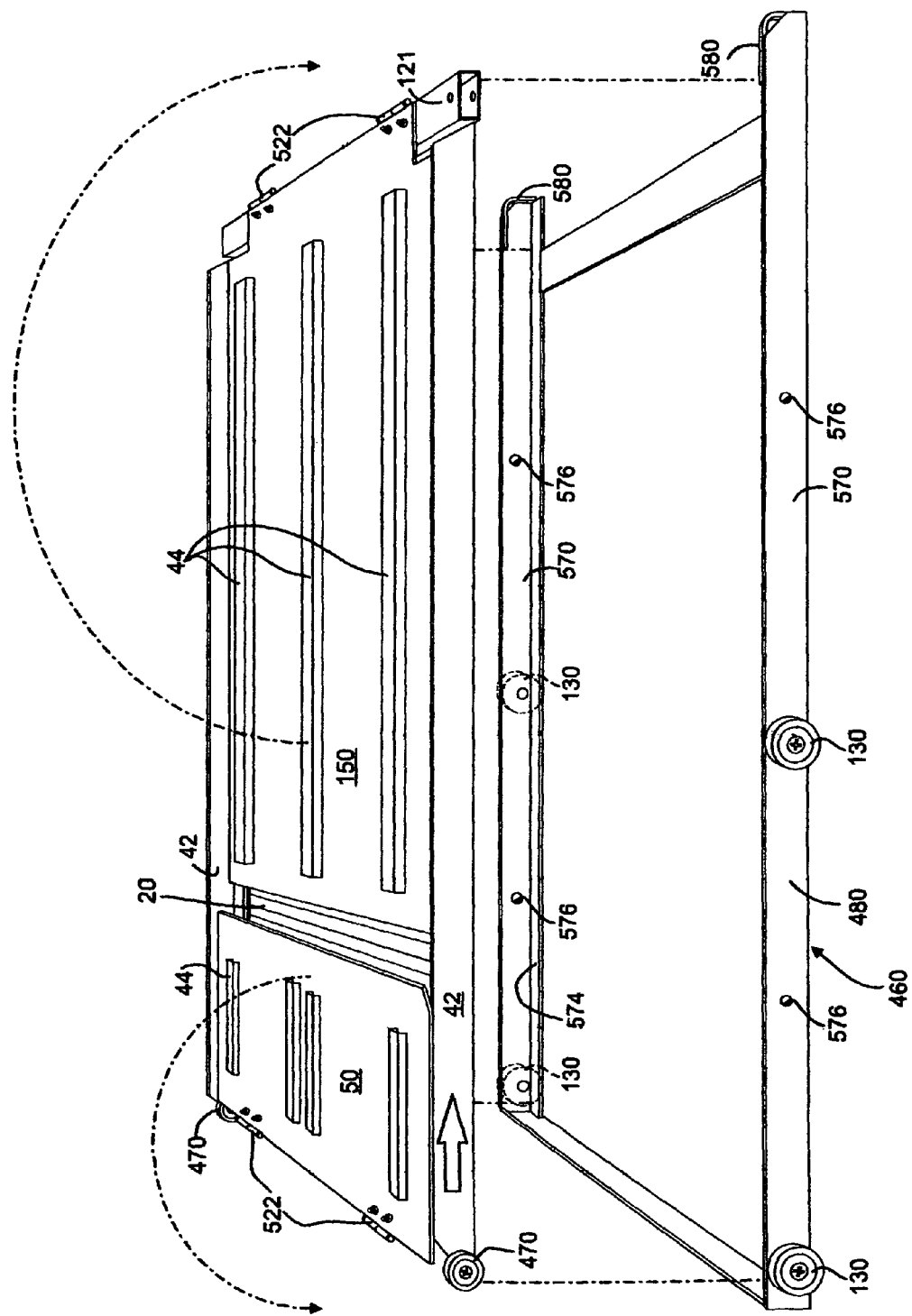
FIG. 10 is a pictorial view of a side view of the dolly slide and ramp extender.

FIG. 9 illustrates one embodiment of a ramp 40, constructed of decking 32. The decking 32 may be of a variety of lengths. The decking 32 may have a tongue 34 on one side that may engage with a groove 34 on a separate decking 32. This way the ramp 40 size may be constructed or altered by adding, removing, or replacing to existing decking 32. The decking 32 may have a decking support member 35 extending downwardly to support the decking 32 within a B-type decking channel 218. In one embodiment a ramp-leg housing 550 may be securely disposed to the ramp 40. The ramp-leg housing 550 may have a leg top channel 560 that is capable of receiving a leg 140 that may be removably disposed within the ramp-leg housing 550.

FIG. 11 is a pictorial of an embodiment of a dolly slide 460 of the present invention 10. The dolly slide 460 may be rollably engaged within the B-type ramp channel 220, as seen in FIG. 5B. The ramp-platform displacement wheel 130 may be rotatably disposed to a dolly slide side 570. The ramp-platform displacement wheel 130 may roll within the B-type decking channel 218. The ramp wheel 470 may be rollably disposed within the inside 572 of the dolly slide side 570. For example, the ramp wheel 470 may roll along an inside lower member 574. A ramp wheel stopper 580 (as seen in FIG. 13) may prevent the ramp wheel 470 from falling out of the inside 572.

Figure 12:
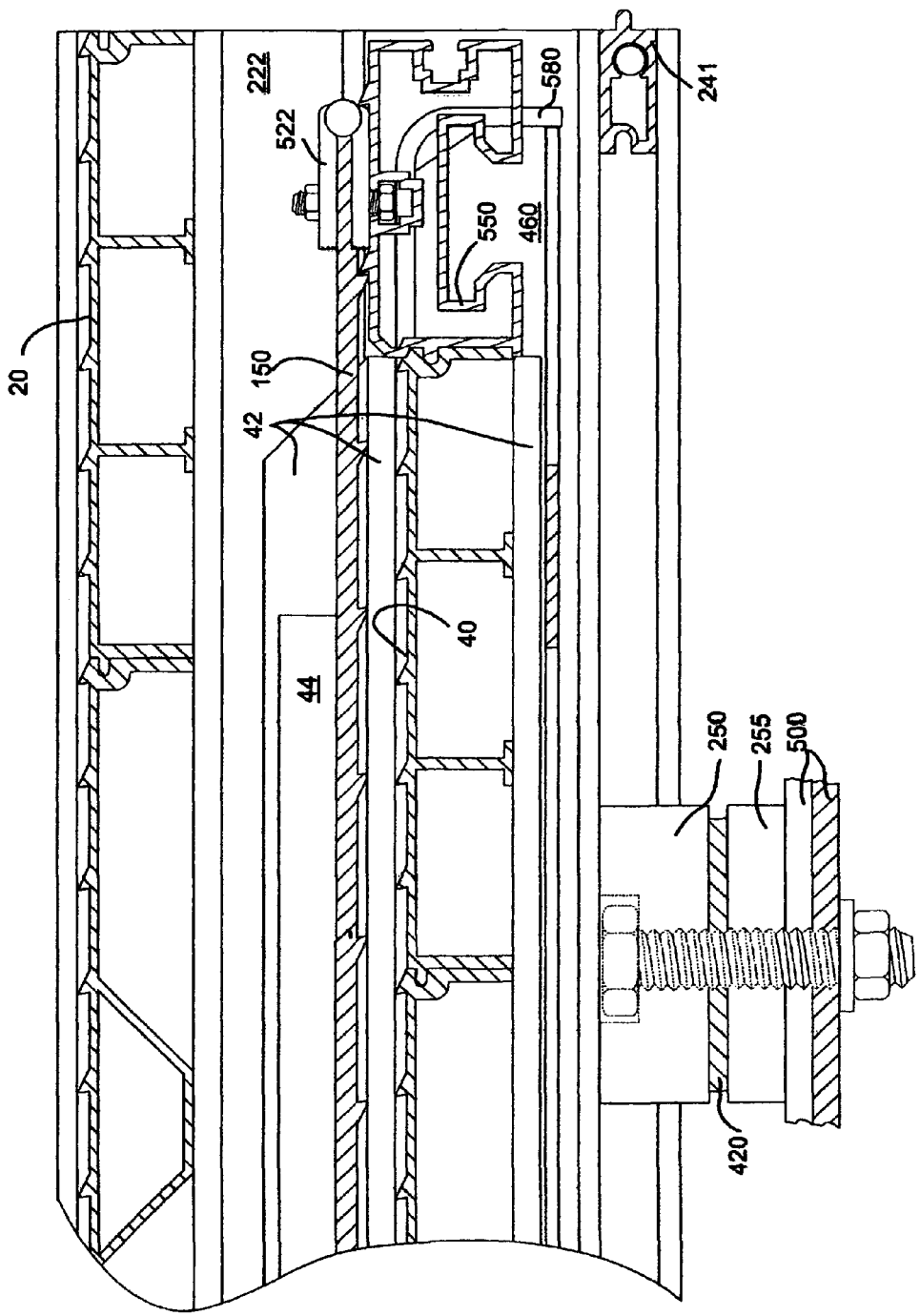
FIG. 12 is sectional pictorial of a closer view from FIG. 8.

FIG. 12 is a pictorial of a closer view of a portion of FIG. 8. The sliding block 250 may be secured to the bed 500 via a bolt 258 (as seen in FIG. 5D). The stop member 132 may be secured within the sliding channel 240 (as seen in FIG. 5B) to limit the displacement of the loading device 10, by contacting the sliding block 250 after a certain distance.

Figure 13:
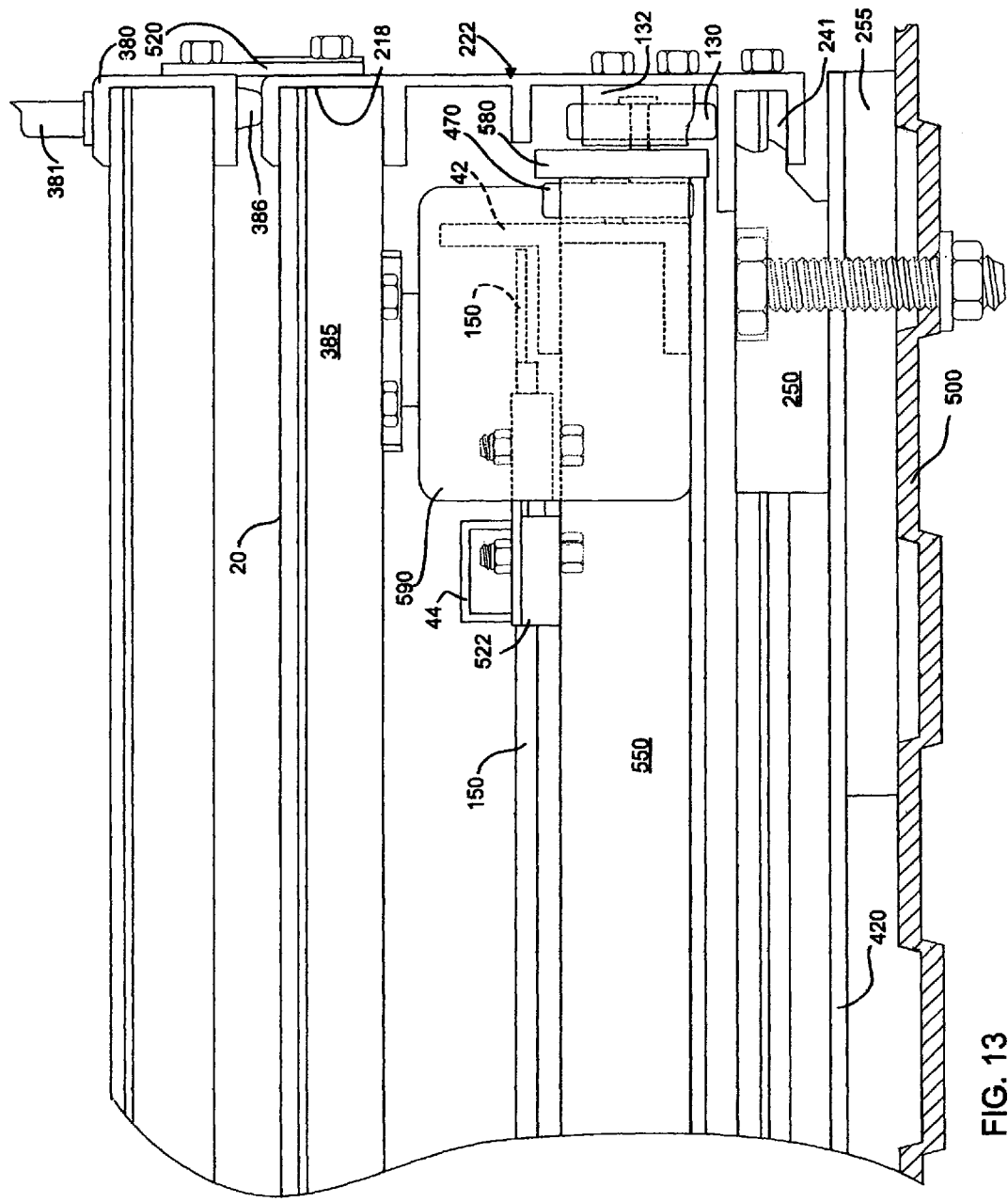
FIG. 13 is another sectional pictorial of a closer view from FIG. 8.

FIG. 13 is a pictorial of a closer view of the ramp 40 and the ramp leg housing 550.

Figure 14:
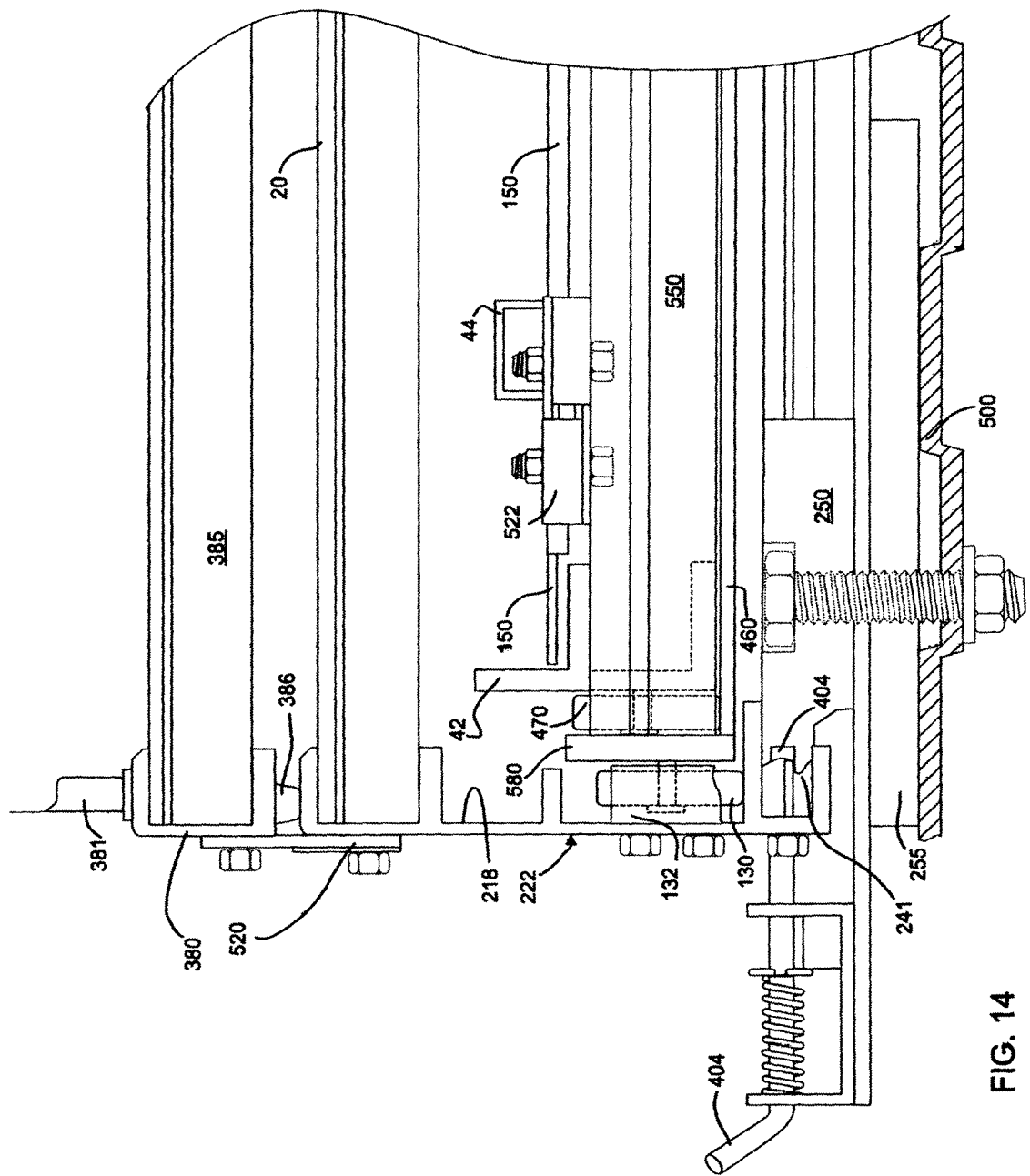
FIG. 14 is a closer view of a portion from FIG. 7.
Figure 15:
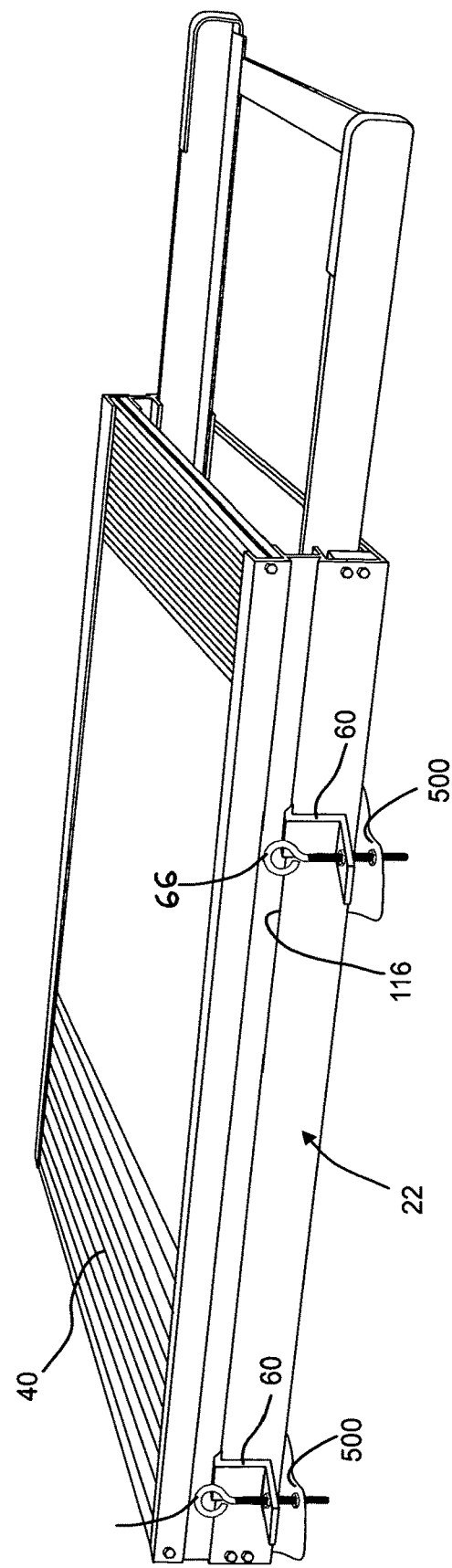
FIG. 15 is a pictorial view of platform side and an embodiment of a ramp.

FIG. 14 is a pictorial of a closer view of the bed 500, the platform side 222, the sliding channel 240, the B-type ramp channel 220, the B-type decking channel 218, and other components.

FIGS. 17 and 18 illustrate an embodiment of a platform side 22. The platform side 22 is disposed on the left side of a bed, and the other on the right side. Only the left side is illustrated in FIG. 17. The platform side 22 may have a decking channel 118 to receive decking 32. The decking may rest on the decking support 122. A ramp channel 120 may be disposed downwardly from said decking channel 118. The ramp channel 120 may be defined by an inside of a second side surface 114, an extension 124 extending inwardly from said second side surface 114, and a ramp support 126 disposed downwardly from said extension 124.

The platform side 22 may have a finger securement catch 116, which mates with the hook portion 102 of the mounting bracket 60 to secure the platform side 22 to the bed, as seen in FIG. 18. This is another means of securing the loading device 10 to a bed 500. The platform side 22 may be used with the mounting bracket 60.

FIG. 18 illustrates how the mounting bracket 60 may be secured to the platform side 22 on the top of the bed of the pickup truck.

In the platform side 22 the platform 20 may be secured in the decking channel 118. In the platform side 22, the dolly slide 460 may be slidably disposed within the ramp channel 120 in the same way that it is disposed in the type ramp channel 220.

It should be understood, of course, that the foregoing relates to exemplary embodiments of the invention and that modifications may be made without departing from the spirit and scope of the invention as set forth in the following claims.

I claim:

1. A loading device (10) slidably secured to a pick-up truck bed (500), comprising:
    a platform side (222) secured to opposed sides of a platform (20);
    a base frame (420) secured to a bed (500); said base frame having a sliding block (250) secured to a sliding block extension (255);
    a ramp (40) having a ramp wheel (470) slidably engaged with a dolly slide (460);
    said dolly slide (460) having a ramp-platform displacement wheel (130) that rotatably engages to roll within a ramp channel (220);
    the dolly slide (460) extends out above a tailgate so that no load or weight is applied to the tailgate;
    whereby said loading device (10) can be pulled or displaced rearwardly by the sliding block (250) sliding relationship with a sliding channel (240);
    said platform side (222) slidably disposed on said sliding block (250);
    said sliding block (250) slidably disposed within said sliding channel (240);
    a front hinge plate (380) is hingedly disposed on one side of the platform side (222);
    forward hinge plate legs (381) extend from the front hinge plate (380) so the front hinge plate can be placed in a substantially horizontal position;
    a rear hinge plate (50) hingedly connected to said ramp (40) via a hinge (522);
    a ramp extender (150) is hingedly connected to the ramp (40) via a hinge (522); and
    a leg (140) connected to said ramp (40);
    whereby when the leg is extended to the ground, the ramp (40) may be positioned horizontally.

2. A loading device (10) slidably secured to a pick-up truck bed (500) consisting essentially of:
    a platform side (222) secured to opposed sides of a platform (20);
    a base frame (420) secured to a bed (500); said base frame having a sliding block (250) secured to a sliding block extension (255);
    a ramp (40) having a ramp wheel (470) slidably engaged with a dolly slide (460);
    said dolly slide (460) having a ramp-platform displacement wheel (130) that rotatably engages to roll within a ramp channel (220);
    the dolly slide (460) extends out above a tailgate so that no load or weight is applied to the tailgate;
    whereby said loading device (10) can be pulled or displaced rearwardly by the sliding block (250) sliding relationship with a sliding channel (240);
    a said platform side (222) slidably disposed on said sliding block (250);
    said sliding block (250) slidably disposed within said sliding channel (240);
    a front hinge plate (380) is hingedly disposed on one side of the platform side (222);
    forward hinge plate legs (381) extend from the front hinge plate (380) so the front hinge plate can be placed is in a substantially horizontal position;
    a rear hinge plate (50) hingedly connected to a ramp (40) via a hinge (522);
    a ramp extender (150) is hingedly connected to the ramp (40) via a hinge (522); and
    a leg (140) connected to said ramp (40);
    whereby when the leg is extended to the ground, the ramp (40) is positioned horizontally.

* * * * *